United States Patent [19]

Crawford

[11] Patent Number: 5,531,539
[45] Date of Patent: Jul. 2, 1996

[54] TIGHTLY FITTING PANEL CONNECTION ASSEMBLY

[75] Inventor: John Crawford, Valrico, Fla.

[73] Assignee: Exposystems, Inc., Tampa, Fla.

[21] Appl. No.: 17,151

[22] Filed: Feb. 12, 1993

[51] Int. Cl.⁶ .................................................. A47G 5/00
[52] U.S. Cl. ........................... 403/381; 403/331; 403/169; 403/231; 160/135; 52/239
[58] Field of Search .................................. 403/381, 169, 403/174, 175, 170, 231, 331; 160/135, 231.1, 232.2; 52/239, 586, 587

[56] References Cited

U.S. PATENT DOCUMENTS

| | | |
|---|---|---|
| 2,652,713 | 9/1953 | Senglar ........................................ 52/587 |
| 3,326,268 | 6/1967 | Dixon .................................... 160/231.2 |
| 3,889,736 | 6/1975 | Firks . |
| 4,021,973 | 5/1977 | Hegg et al. . |
| 4,166,332 | 9/1979 | Donovan . |
| 4,344,475 | 8/1982 | Frey . |
| 4,375,829 | 3/1983 | Dorr et al. . |
| 4,652,170 | 3/1987 | Lew ............................................ 403/381 |
| 4,830,080 | 5/1989 | Densen . |
| 4,935,995 | 6/1990 | Daus, Jr. . |
| 4,968,171 | 11/1990 | Shell . |
| 5,091,607 | 2/1992 | Stob ....................................... 52/239 X |
| 5,092,385 | 3/1992 | Beaulieu . |
| 5,179,810 | 1/1993 | Gename ............................. 160/135 X |
| 8,592,289 | 7/1971 | Aysta et al. . |

OTHER PUBLICATIONS

Octanorm, Double Form System parts DFS, pp. 1, 2, and 4.
"The Elegant Modular Exhibit System", Nimlok Exhibit System, L88.
Octanorm, Double Form Assembly Report (Doppelform Montage Report.

*Primary Examiner*—Anthony Knight
*Attorney, Agent, or Firm*—Hodgson, Russ, Andrews, Woods & Goodyear

[57] ABSTRACT

A panel connection assembly for providing a tight fit between a pair of panels for a pleasing seamless effect. A pair of elongate first connector members are connected to the panel edges respectively. An elongate second connector member has a narrow central portion and a pair of enlarged portions between which the central portion extends. Each of the first connector members has an opening including a throat opening into an enlarged inner cavity. The openings of the first connector members together have a complementary shape to that of the second connector member for receiving the central portion in both of the throats and the enlarged portions in the cavities respectively for connecting the panels. Fabric covers the outer sides of each panel. An edge portion of the fabric extends between the corresponding frame member of the respective panel and the respective frame member of the other panel and is tucked between the corresponding frame member and the respective first connector member of the respective panel so that the fabric extends beyond the outer side of the respective first connector member. The distance over which the central portion extends is selected to effect pressing of the fabric edge portions together to effect a tight fit. The enlarged portions are, in cross-section, preferably triangular-shaped to provide a wedging effect. Also disclosed are a pair of hingedly connected panel facing members each having a formation comprising one of the enlarged portions and the corresponding half of the central portion for engaging a corresponding complementary opening in a connector member in a corresponding panel edge. Also disclosed is an elongate single-piece post having the throat and cavity on at least two sides thereof for receiving second connector members respectively for connecting two or more panels at a corner.

19 Claims, 1 Drawing Sheet

TIGHTLY FITTING PANEL CONNECTION ASSEMBLY

The present invention relates generally to panel display structures for trade show exhibition booths and the like. More particularly, the present invention relates to apparatus for connecting panels together to form such structures.

Examples of panel connection assemblies and the like are found in U.S. Pat. Nos. 3,889,736; 4,021,973; 4,166,332; 4,344,475; 4,830,080; 4,935,995; 4,968,171; and 5,092,385.

It is considered desirable that modular display systems have a pleasing overall appearance including a seamless effect so that there is no interruption of graphic area.

U.S. Pat. No. 3,889,736 to Firks, the disclosure of which is hereby incorporated herein by reference, discloses a display screen wherein a pair of panels are connected by means of what is described as a dumbbell-like cross-sectional configuration extrusion. One-half of the extrusion, which has a narrow central portion extending between a pair of cylindrical portions, is inserted into a complementarily shaped opening of each of a pair of facing retainer strips, composed of rigid polyurethane, which are inserted in and connected to the edges of the pair of panels along the lengths thereof. In cross-section, the circular portions thus extend at an angle of substantially 90 degrees relative to the central portion at the intersection therebetween, i.e., a tangent to the circle extends at such an angle. Each retainer strip includes a portion which contains the opening and which fits within a cut-out in the panel edge and a portion which extends therefrom inwardly of the panel into a groove. This lower portion has a series of longitudinal serrations to act as barbs to assist in securing the retainer strip in the groove. Adhesives, brads, and the like may also be used to aid retention of the retainer strip. It is stated that the ends of the dumbbell need not be perfectly circular and may be oval or faceted.

Firks also discloses a plastic hinge strip comprising a pair of members for facing and engaging respective panel edges integrally joined by a continuous thin bridge portion to form a flexible hinge area. Each of the members includes an integral leg and bead corresponding to half of the dumbbell. The hinge strip is composed of crystalline polypropylene homopolymer or copolymer. A panel edge molding strip having an integral leg and bead is composed of a softer, more resilient, plastic such as a vinyl, e.g., plasticized polyvinyl chloride.

Firks states that the system employing the dumbbell-like member is for coupling adjacent panels in a close abutting relationship where it is either unnecessary or undesirable that the panels be free to move with respect to each other. The figures are drawn to appear to show a "perfect" zero-tolerance between the parts, which in actuality would of course not allow the elongate dumbbell-like member to be slid in a usual manner into the openings of the retainer strips due to the resulting friction.

In actual usage, the dumbbell-like member is of course manufactured to be smaller than the openings. This is recognized in the Firks disclosure by the statement at Col. 4, lines 41 to 46, that the legs and beads are "dimensioned to slide freely" into the respective channels and undercut channels.

The resulting high tolerance between the parts and the central portion length fail to achieve the desired close abutting relationship for a seamless effect between the panels. Instead, a loose or sloppy fit between the panels is undesirably achieved.

Posts have also been provided for fitting two, three, or four panels together at a corner. One such post is composed of extruded aluminum having plastic inserts in elongate openings thereof. One half of the dumbbell-like member is inserted in a complementarily shaped opening in an insert and the other half is inserted in a complementarily shaped opening in a retainer strip attached in a panel edge. For manufacture of such a post, the insert must be hot-melted into the channel and cured. The manufacturing is thus labor-intensive and expensive. Having to combine two kinds of parts to make a connector makes the connector weak and inefficient from a design and quality standpoint. In addition, the inserts may undesirably tend to come loose in the channel after numerous uses.

It is accordingly an object of the present invention to tightly connect two panels together for a seamless effect.

It is another object of the present invention to provide an inexpensive and easy to use post for connecting two or more panels at a corner.

In order to provide a tight connection between two panels for a seamless effect, in accordance with the present invention an elongate connector member having in cross-section a narrow central portion and a pair of enlarged portions between which the central portion extends is received in complementarily shaped openings of a pair of connector members mounted in the panel edges along the lengths thereof for connecting the panels. Edge portions of fabric covering the panels wrap around the abutting edges of panel frame members respectively and are tucked between the frame members and the connector members mounted in the panel edges respectively for tightening the connection of the panels. The distance which the central portion extends between the enlarged portions is chosen to effect compression of the fabric when the connector members are engaged whereby a tight connection may be achieved. In cross-section, each enlarged portion is preferably triangular-shaped with a pair of sides which flare outwardly from the central portion at an angle relative thereto of between about 10 and 45 degrees. To provide easier sliding therebetween, at least one of the connector members is composed of a self-lubricating material.

Further in accordance with the present invention a single-piece post is provided wherein the openings for receiving two or more connector members are formed in a single piece so that it is unnecessary to provide inserts whereby the post may be manufactured inexpensively and be easy to use.

The above and other objects, features, and advantages of the present invention will be apparent in the following detailed description of the preferred embodiments thereof when read in conjunction with the accompanying drawings wherein the same reference numerals denote the same or similar parts throughout the several views.

BRIEF DESCRIPTION OF THE DRAWINGS

In FIGS. 2 to 5, the cross-sectional shapes or end views of the various assemblies or parts are understood to be the same throughout the lengths of the panel edges to which they are attached.

DETAILED DESCRIPTION OF THE PREFERRED EMBODIMENTS

Figure 1:
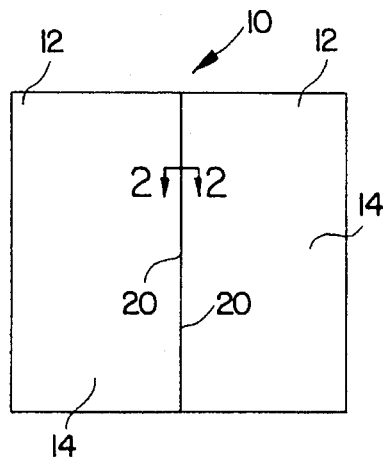
FIG. 1 is a side view of a pair of panels connected in accordance with the present invention.
Figure 2:
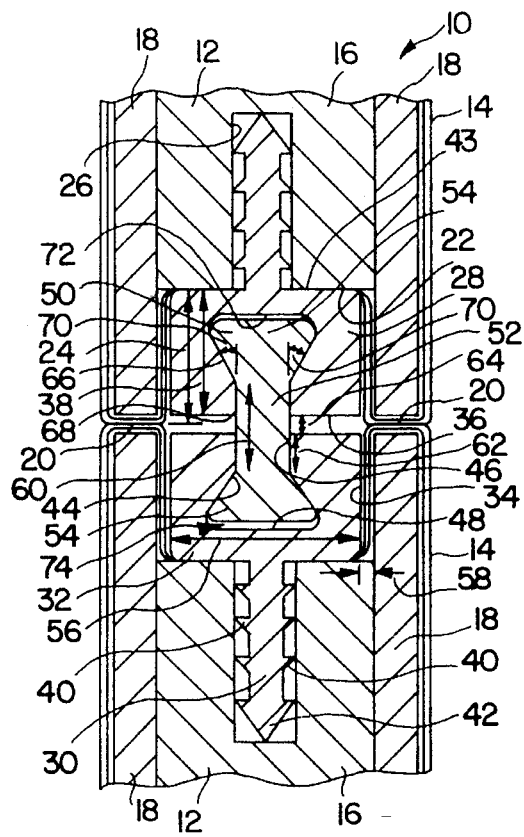
FIG. 2 is a cross-sectional view taken along line 2—2 thereof and showing a connector assembly in accordance with the present invention.

Referring to FIGS. 1 and 2, there is shown generally at 10 an assembly of two rectangular identical panels 12 whose opposite faces are covered with a suitable cloth material 14 for a pleasing appearance. These panels 12 may be similarly connected to other panels to form a display for a trade show exhibition or the like, the cloth 14 having graphic designs as may be desired for the display. These panels 12 may, for example, each have a length of perhaps 44 inches and a width of perhaps 22 inches, these dimensions of course varying depending on display requirements. Although the panels are shown as flat, they may alternatively be curved.

Each panel 12 includes a generally rectangular structural panel board 16, composed of ½ inch thick poplar or other suitable material, to the opposite broad sides of which are adhesively or otherwise suitably attached a pair of generally rectangular thin frame members or skins 18, composed of ⅛ inch thick Luan door skin or other suitable material, respectively. The overall thickness of the panels 12 may thus be about ¾ inch so as to be perhaps half of the thickness of typical conventional panels so that they may be lighter and more cost effective for the consumer and may be sufficiently light and compact for savings in shipping costs.

Facing panel edges are illustrated at 20. As seen in FIG. 2, the fabric 14 wraps around the edges of the frame members 18 to define the panel edges 20, the frame members 18 thus terminating short of the panel edges 20 by a distance equal generally to the thickness of the cloth 14 wrapping thereabout.

The panel board 16 has an edge 22 which is recessed from the frame member edges and is accordingly recessed from the panel edge 20 a distance, illustrated at 24, thus providing a recess or space, illustrated at 34, between the frame members 18 over the length of the edge 20.

An elongate groove, illustrated at 26, is provided in the edge 22 centrally thereof and over the length thereof. This groove may have a width of perhaps about 0.075 inch and a depth of perhaps about 0.375 inch.

In the recess 34 between the frame members 18 and in groove 26 is attached an elongate extruded first connector member 28, which may be called a Y-connector, which extends over the length of the panel edge 20 and has a narrow portion 30 which is received in the groove 26 and a wide portion 32. The first connector member 28 is inserted into the groove 26 and recess 34 so that the wide portion 32 engages the panel board edge 22 to thereby precisely define the position of the outer side or edge 36 of the first connector member 28. The height, illustrated at 38, of the wide portion 32 is less than recess depth 24 by an amount equal approximately to the thickness of the fabric 14 so that the first connector member 28 is recessed slightly from the panel edge 20. In other words, edge 36 is approximately co-extensive with the edges of the frame members 18. Narrow portion 30 may have a width of perhaps about 0.072 inch and have a plurality of perhaps 4 spaced serrations 40 along its sides for digging into the sides of the groove 26 for securing the first connector member 28 to the panel, similarly as described in the Firks patent, and adhesive, staples, brads, or the like may be employed to supplement the securing effect of the serrations 40. Narrow portion 30 is provided with a pointed end 42 to dig into the panel board 16 to insure engagement of edge 22 by the inner side 43 of wide portion 32.

An elongate opening, illustrated at 44, is provided in the outer side 36 into the wide portion 32 centrally thereof and over the length thereof. The opening 44 has a narrow throat 46 which opens into an enlarged inner cavity 48. The openings 44 for the two panels 12 together receive a complementarily shaped elongate second connector member 50, which is a male connector which may be called a slide connector, by sliding the second connector member 50 longitudinally of the openings 44, the second connector member 50 having a length equal substantially to the length of the panel edges 20.

As shown in FIG. 2, in cross-section (a section taken perpendicular to the longitudinal direction), second connector member 50 may be said to be shaped like a bow tie, having a narrow central portion 52 to be received in both throats 46 and a pair of enlarged triangular-shaped portions 54, between which the central portion 52 extends, to be received in the cavities 48 respectively, the throats 46 together having a shape which is complementary to the shape of the central portion 52 and the cavities 48 each having a shape which is complementary to the shape of the respective enlarged portion 54. This triangular wedge configuration of the second connector member 50 is provided to act as a locking mechanism to force the panels together when inserted in the complementarily shaped openings of the first connector members to create a non-visible seam between the panels, without the use of any instruments.

When a retainer strip is fitted into a panel edge with the wide portion, containing an opening for receiving a connector member, inserted in a similarly wide groove in the panel board, as in the Firks patent, the panel board must be sufficiently thick to support the wide groove. By constructing first connector member 28 so that wide portion 32 thereof is not fitted within a wide groove but instead rests on or engages the recessed panel board edge 22, the panel may be constructed to be narrower, i.e. about ¾ inch or less, as previously discussed, so that a lighter and more compact panel assembly may be provided for easier handling as well as cost savings.

The width, illustrated at 56, of the wide portion 32 may perhaps be about 27/64 inch, which would leave a gap, illustrated at 58, between the wide portion 32 and each frame member 18 of about 5/128 inch for receiving the thickness of the fabric 14, which is wrapped about the frame member edge and tucked into the gap. The wide portion 32 may be rounded, as shown in FIG. 2, at the bottom of the gap 58 for aiding in tucking the fabric 14.

In order to provide a tight connection of the panels so that relative movement therebetween is minimized, the central portion 52, which may have a thickness of perhaps about 0.062 inch, extends in cross-section over a distance, illustrated at 60, which is equal to the distance, illustrated at 62, in cross-section which one throat 46 extends plus the distance 62 in cross-section which the other throat 46 extends plus the distance, illustrated at 64, between the first connector members 28 when they are pressed together to the desired tightness, thus compressing the fabric 14. For example, each of the throats 46 may extend over a distance 62 of perhaps about 0.072 inch, and the distance 64 may perhaps be about 0.036 inch when the panel edges are pressed tightly together as desired. The distance 60 over which the central portion extends may accordingly be about 0.180 inch. The enlarged portions 54, being spaced apart this distance 60, upon being received in the openings 44 therefore effect compression of the fabric 14 until the distance 64 is achieved to therefore effect the tightness desired.

The enlarged portions 54 have generally the shapes in cross-section of triangles, with sides 66 extending outwardly from the parallel sides 68 of central portion 52 at acute angles, illustrated at 70, in order to wedgingly force the panel edges 20 together as the second connector member 50 is inserted in the openings 44 of the first connector members 28 resulting in zero tolerance along the sides 66. The overall length in cross-section of second connector member 50 is less than the length between the bottoms 72 of openings 44, as illustrated by gaps 74, to allow some tolerance between the enlarged portions 54 and the cavities 48 so that the second connector member 50 may be inserted in openings 44 without undue difficulty. If angle 70 is less than about 10 degrees, there may be a tendency of the enlarged portions 54 to pull into the throats 46 thus loosening the connection. If angle 70 is greater than about 45 degrees, the width of the enlarged portions 54 may be so great as to require the panel thickness to be increased. Thus, the angle 70 is desirably between about 10 and 45 degrees, preferably about 30 degrees (so that enlarged portion 54 has in cross-section the shape of an equilateral triangle) to provide for ease of extrusion.

In order to aid sliding of second connector member 50 within openings 44, either or both of the connector members 28 and 50 are preferably composed of a self-lubricating material, i.e., a material whose make-up is such as to provide lubrication for reduced friction during sliding contact. Examples of self-lubricating materials include polypropylene, polyethylene, polytetraflouroethylene, and Delrin plastic manufactured by Nytef Plastics Ltd., a dupont company, and polyester. Examples of materials which are not self-lubricating are polystyrene, acrylonitrile butadiene styrene (ABS), and polycarbonate. The connector members 28 and 50, for example, may be composed of a self-lubricating type of rigid nylon identified as MDS nylon and manufactured by Nytef Plastics, Ltd., a dupont company.

Figure 3:
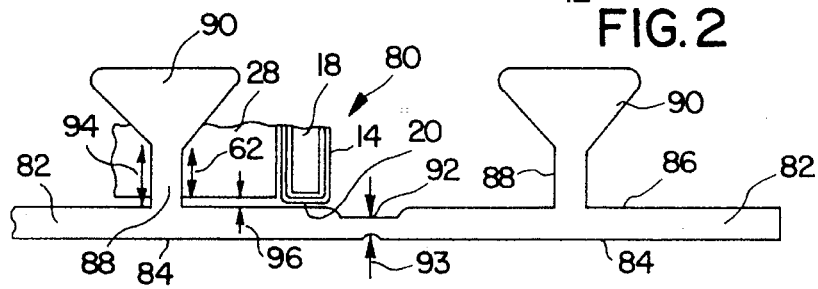
FIG. 3 is an end partial view of a connector assembly in accordance with an alternative embodiment of the present invention.

Referring to FIG. 3, there is shown at 80 an elongate connector member in accordance with an alternative embodiment of the present invention. Connector 80 includes a pair of elongate trim portions 82 for engaging the edges 20 respectively of a pair of panels 12 for presenting decorative surfaces 84 to view. Extending from the opposite or inner surfaces 86 centrally thereof are a pair of elongate narrow portions 88, similar but shorter in cross-section to narrow portions 52, as discussed hereinafter, which terminate respectively in a pair of elongate enlarged portions 90, which are similar to enlarged portions 54. Similarly as shown for the enlarged portions 54 and central portion 52 of second connector member 50 in FIG. 2, each enlarged portion 90 and its associated narrow portion 88 of the embodiment of FIG. 3 is inserted in the cavity 48 and corresponding throat 46 of a respective first connector member 28 for a respective panel 12. The connector 80 is provided with a portion 92 of reduced thickness between the trim portions 82 continuously over the length thereof to provide a flexible hinge area so as to allow adjustment of the orientations of the panels 12 through up to an 180 degree radius relative to each other. For example, portions 82 may have a thickness of perhaps about 0.06 inch while flexible portion 92 may have a thickness, illustrated at 93, of perhaps about 0.015 inch. In order to provide the desired flexibility, allowing perhaps 1000 flexes or more, connector 80 may be composed of polypropylene or other suitable material.

In order to provide a tight connection of a trim portion 82 to a respective panel 12 so that relative movement therebetween is minimized, the narrow portion 88 extends over a distance, illustrated at 94, in cross-section which is equal to the distance 62 over which the respective throat 46 extends in cross-section plus the distance 96 between the trim portion 82 and the respective first connector member 28 when they are pushed together, compressing the fabric 14 to the desired tightness. For example, the distance 96 between a trim portion 82 and the respective first connector member 28 may perhaps be about 0.018 inch when the trim portion 82 is pressed tightly against the respective panel edge 20 as desired. With the distance 62 over which the throat 46 extends in cross-section being about 0.072 inch, the distance 94 over which narrow portion 88 extends in cross-section would desirably be about 0.090 inch.

Figure 4:
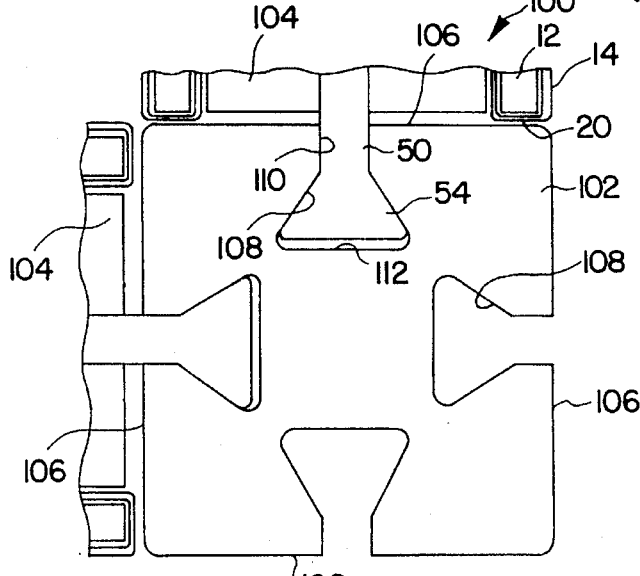
FIG. 4 is an end partial view of a connector assembly including a post in accordance with another embodiment of the present invention.

The assembly of FIG. 2 allows two panels to be joined end-to-end in a continuous plane while the assembly of FIG. 3 allows two panels to be joined at an adjustable angle relative to each other. It may also be desired to assemble as many as four panels extending to a corner at right angles to each other. Referring to FIG. 4, there is illustrated at 100 an assembly including a lightweight elongate post 102 to which up to four panels 104 may be attached so that they extend at right angles to each other. The post 102 has a length equal generally to the length of a panel edge 20 to which it is attached and has four elongate sides 106 at right angles to each other. Each side 106 has a width equal substantially to a panel edge width so that the post 102 is generally square in cross-section. One enlarged portion 54 of a second connector member 50 is received in an opening 44 of a first connector member 28 for a panel 12 to be connected thereto. An elongate opening 108 is provided in each of the sides 106 centrally thereof. The opening 108 has an elongate throat 110 which opens into an elongate enlarged cavity 112, similar to throat and enlarged cavity 46 and 48 respectively, for receiving the other enlarged portion 54. Thus, four panel edges 20 may be connected to the four post sides 106 respectively, and panels may be configured from one to four levels high.

In order that the post 102 may be made inexpensively and be easy to work with during assembly, it is made as a single piece with the openings 108 therein. By adding the wedge shape into the post as a single piece, added strength, structurality, and flexibility may be added as well as a tight non-visible lock. For example, post 102 may be a single piece of extruded aluminum providing strength and efficiency.

Figure 5:
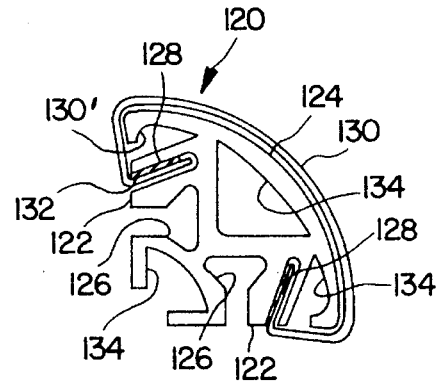
FIG. 5 is an end view showing a post for a connector assembly in accordance with another embodiment of the present invention.

Referring to FIG. 5, there is shown at 120 an elongate post for connecting two panels 12 extending at right angles to each other. This post 120 may be provided to cosmetically finish outside corner joints of panels when not in straight-line configuration for a seamless flowing effect. The post 120 has a length equal generally to the panel edge length. The post 120 has two sides 122 at right angles to each other and a quarter-round side 124 connecting the sides 122. A pair of openings 126, similar to openings 108, are provided in the sides 122 centrally thereof for receiving second connector member 50. The post 120 is also formed as a single piece such as of rigid extruded pvc or other suitable material.

A barbed channel 128 is provided in each side 122 between the respective opening 126 and the quarter-round side 124 for receiving an end of fabric 130 which covers the quarter-round side 124 to provide a pleasing appearance. The edges of the fabric 130 extend along the sides 122 respectively to and are tucked into the respective channels 128 and suitably held in place such as by barbs 132 and glued to the corners. Openings or voids, illustrated at 130', may be provided during the manufacturing process for lightening the post 120, for reducing material usage, or for other suitable manufacturing reasons.

Although the invention has been described in detail herein, it should be understood that the invention can be embodied otherwise without departing from the principles thereof, and such other embodiments are meant to come within the scope of the present invention as defined in the appended claims.

What is claimed is:

1. An assembly for connecting a pair of panels comprising a pair of elongate first connector members, means for mounting said first connector members in elongate edge portions respectively of the panels, an elongate second connector member having a pair of elongate formations each including an elongate narrow portion and an elongate enlarged portion from which said narrow portion extends, said first connector members each comprising elongate opening means which includes narrow elongate throat means and elongate enlarged cavity means inwardly of said throat means and which has a shape which is complementary to the shape of said respective formation for receiving said narrow portion and said enlarged portion respectively for connecting said first connector members, said enlarged portion being generally triangular-shaped in cross-section and including in cross-section a pair of sides which flare outwardly from said narrow portion at an angle relative to said narrow portion of between about 10 and 45 degrees.

2. An assembly according to claim 1 wherein said narrow portion has a pair of parallel sides.

3. An assembly according to claim 1 wherein at least one of said first and second connector members is composed of a self-lubricating material.

4. An assembly according to claim 1 wherein each said enlarged portion has a shape in cross-section of substantially an equilateral triangle.

5. An assembly according to claim 1 wherein said narrow portions together comprise a central portion of said second connector member which central portion extends between said enlarged portions.

6. An assembly according to claim 1 wherein said second connector member includes a pair of panel edge facing members and means for hingedly connecting said facing members, said formations extending from said facing members respectively.

7. A panel assembly comprising at least one pair of panels having elongate facing edge portions respectively, each said panel including a generally rectangular board having a pair of opposite sides and further including a pair of generally rectangular frame members attached to said board sides respectively and extending, along said respective edge portion, beyond said board, a pair of elongate first connector members extending longitudinally along said edge portions of said panels respectively and including portions which have opposite outer and inner sides and which extend from said boards respectively with said outer sides of said connector member portions facing each other, each said first connector member portion being disposed between and spaced from said respective frame members, means for attaching said first connector members to said respective boards, an elongate second connector member including an elongate narrow central portion and a pair of enlarged elongate portions between which said narrow portion extends, said first connector members each comprising elongate opening means which includes elongate throat means in said respective outer side and elongate enlarged cavity means and which has a shape which is complementary to the shape of said second connector member for receiving said central portion in said throat means of both said first connector members and said enlarged portions in said cavity means of said first connector members respectively for thereby connecting said pair of panels together, each of said frame members having an inner surface engaging one of said sides of said board and an outer surface, fabric respectively covering each said outer surface and including an edge portion which extends longitudinally beyond said respective first connector member and between an edge of said respective frame member of said respective panel and an edge of said corresponding frame member of the other of said panels and tucked between said inner surface of said respective frame member and said respective first connector member portion, said central portion of said second connector member having, in cross-section, a length which is equal to combined lengths, in cross-section, over which said throat means of said first connector members extend plus a distance equal to a distance between said first connector members which effects compressing of said fabric between said respective frame members of said panels respectively when said first connector members are connected to said respective boards and said second connector member enlarged portions are received in said first connector member cavity means respectively whereby to tighten the connection of said pair of panels with the fabric edge corresponding to said fabric edge portion hidden from view, wherein each said enlarged portion is generally triangular-shaped in cross-section and includes a pair of sides which flare outwardly from said central portion at an angle relative to said central portion of between about 10 and 45 degrees.

8. A panel assembly according to claim 7 wherein said central portion has a pair of parallel sides.

9. A panel assembly according to claim 9 wherein at least one of said first and second connector members is composed of a self-lubricating material.

10. A panel assembly according to claim 7 wherein each said enlarged portion has a shape in cross-section of substantially an equilateral triangle.

11. A panel assembly according to claim 7 wherein each of said panels has a width which is less than about ¾ inch.

12. A panel assembly according to claim 7 wherein said central portion extends between said enlarged portions a distance equal to the sum of the distances over which both of said throat means extend from said respective cavity means to said respective outer sides of said respective first connector member portions and the distance which said facing outer sides of said first connector member portions are spaced apart when said panel edges are pressed together to a predetermined tightness.

13. A panel assembly according to claim 12 wherein said inner sides of said first connector member portions engage edges of said board respectively to precisely position said outer sides of said first connector member portions relative to the respective edges of said frame members.

14. A panel assembly according to claim 12 wherein said enlarged portion is generally triangular-shaped in cross-section and includes in cross-section a pair of sides which flare outwardly from said central portion, the assembly having zero-tolerance between said enlarged portion sides and said cavity means.

15. As assembly for connecting at least two panels at a corner comprising an elongate single-piece post, at least two elongate connector members for connecting said post to respective edges of the at least two panels, each of said connector members having an elongate narrow central portion and a pair of enlarged elongate portions between which said central portion extends, one of said enlarged portions and the corresponding half of said central portion extending therefrom defining a formation whereby each said connector member has two of said formation, said post including at least two elongate openings each of which includes a narrow elongate throat means and an enlarged elongate cavity means inwardly of said throat means and which has a shape which is complementary to the shape of one of said respective connector member formations for receiving said one of said respective connector member formations, the other of said respective connector member formations having a shape which is complementary to the shape of opening means respectively attached to the respective panel edge for being received therein whereby to connect said post to the edges of the at least two panels respectively, wherein each said enlarged portion is generally triangular-shaped in cross-section and includes a pair of sides which flare outwardly from said central portion at an angle relative to said central portion of between about 10 and 45 degrees.

16. An assembly according to claim 15 wherein at least one of said post and said connector members is composed of a self-lubricating material.

17. An assembly according to claim 15 wherein said post includes four elongate sides and four of said elongate opening means in said four sides respectively.

18. An assembly according to claim 15 wherein said post comprises means for connecting two panels at right angles to each other and a quarter-round molding portion.

19. An assembly according to claim 15 wherein each said enlarged portion has a shape in cross-section of substantially an equilateral triangle.

* * * * *